United States Patent
Hardin et al.

(10) Patent No.: US 10,053,966 B2
(45) Date of Patent: Aug. 21, 2018

(54) NANOGAS FLOODING OF SUBTERRANEAN FORMATIONS

(71) Applicant: Nano Gas Technologies, Inc., Deerfield, IL (US)

(72) Inventors: Jeffrey K Hardin, Wilmette, IL (US); Scott A. Fiedler, Palatine, IL (US); Rudy M Folds, Abilene, TX (US)

(73) Assignee: Nano Gas Technologies Inc., Deerfield, IL (US)

( * ) Notice: Subject to any disclaimer, the term of this patent is extended or adjusted under 35 U.S.C. 154(b) by 0 days.

(21) Appl. No.: 15/814,509

(22) Filed: Nov. 16, 2017

(65) Prior Publication Data

US 2018/0073336 A1    Mar. 15, 2018

Related U.S. Application Data

(63) Continuation of application No. PCT/US2017/032862, filed on May 16, 2017.

(60) Provisional application No. 62/337,431, filed on May 17, 2016.

(51) Int. Cl.
*E21B 43/16* (2006.01)
*E21B 43/34* (2006.01)

(52) U.S. Cl.
CPC .......... *E21B 43/166* (2013.01); *E21B 43/164* (2013.01); *E21B 43/34* (2013.01)

(58) Field of Classification Search
CPC .. E21B 41/0078; E21B 43/164; E21B 43/166; E21B 43/38; E21B 43/385; E21B 43/40
See application file for complete search history.

(56) References Cited

U.S. PATENT DOCUMENTS

| | | |
|---|---|---|
| 2,262,428 A | 11/1941 | Tempelaar |
| 2,740,478 A | 4/1956 | Greene |
| 2,875,833 A | 3/1959 | Martin |
| 3,065,790 A | 11/1962 | Holm |
| 3,136,361 A | 6/1964 | Marx |
| 3,208,519 A | 9/1965 | Moore |
| 3,278,233 A | 10/1966 | George et al. |
| 3,451,477 A | 6/1969 | Kelley |
| 3,469,630 A | 9/1969 | Hurd et al. |
| 3,498,378 A | 3/1970 | Stone et al. |
| 3,530,937 A | 9/1970 | Bernard |
| 3,560,053 A | 2/1971 | Ortloff |

(Continued)

FOREIGN PATENT DOCUMENTS

| | | | |
|---|---|---|---|
| CN | 203948078 | 11/2014 | |
| JP | 2008019644 A | * 1/2008 | ........... E21B 43/166 |

(Continued)

OTHER PUBLICATIONS

ISR/WO for PCT/US2017/032862 (dated Aug. 7, 2017).
Petro Industry News, What is API Gravity, 2015 (https://www.petro-online.com/news/fuel-for-thought/13/breaking-news/what-is-api-gravity/33309).

*Primary Examiner* — Jennifer H Gay

(57) ABSTRACT

Herein are provided tools and processes for extracting oil from subterranean formation. The processes can include lightening the oil in the formation prior to extraction by the addition of a nanogas solution. The tools include injectors for the formation of the nanogas solution within the subterranean formation.

20 Claims, 5 Drawing Sheets

(56) References Cited

U.S. PATENT DOCUMENTS

| | | | | |
|---|---|---|---|---|
| 3,599,715 A | * | 8/1971 | Roszelle | C09K 8/594 166/270.1 |
| 3,599,716 A | | 8/1971 | Thompson | |
| 3,617,152 A | | 11/1971 | Cummings | |
| 3,653,438 A | | 4/1972 | Wagner | |
| 3,748,828 A | | 7/1973 | Lefebvre | |
| 3,794,114 A | | 2/1974 | Brandon | |
| 3,915,234 A | | 10/1975 | Pelofsky | |
| 3,915,499 A | * | 10/1975 | Mallon | E21B 43/28 299/4 |
| 4,033,411 A | * | 7/1977 | Goins | E21B 43/168 166/257 |
| 4,192,742 A | | 3/1980 | Bernard et al. | |
| 4,212,354 A | | 7/1980 | Guinn | |
| 4,498,531 A | * | 2/1985 | Vrolyk | E21B 36/02 166/59 |
| 4,635,724 A | * | 1/1987 | Bruckdorfer | C04B 18/08 106/706 |
| 4,788,020 A | | 11/1988 | Yampolsky et al. | |
| 5,129,457 A | | 7/1992 | Sydansk | |
| 5,180,503 A | * | 1/1993 | Gorelick | B01D 17/0205 210/170.07 |
| 5,403,473 A | | 4/1995 | Moorehead et al. | |
| 5,620,593 A | * | 4/1997 | Stagner | B01D 19/0005 166/372 |
| 5,725,054 A | | 3/1998 | Shayegi et al. | |
| 6,105,672 A | * | 8/2000 | Deruyter | E21B 43/16 166/270.1 |
| 6,209,855 B1 | | 4/2001 | Glassford | |
| 6,689,262 B2 | | 2/2004 | Senkiw | |
| 7,008,535 B1 | | 3/2006 | Spears et al. | |
| 7,294,278 B2 | | 11/2007 | Spears et al. | |
| 7,537,200 B2 | | 5/2009 | Glassford | |
| 7,648,640 B2 | * | 1/2010 | Kerfoot | B01F 3/04262 210/170.07 |
| 7,651,611 B2 | * | 1/2010 | Kerfoot | B09C 1/002 210/170.07 |
| 7,661,657 B2 | * | 2/2010 | Kerfoot | B01F 3/04262 210/198.1 |
| 7,730,958 B2 | | 6/2010 | Smith | |
| 8,002,038 B2 | | 8/2011 | Wilson | |
| RE43,350 E | * | 5/2012 | Kerfoot | B09C 1/00 210/170.07 |
| 8,276,888 B2 | | 10/2012 | Osborn et al. | |
| 8,302,941 B2 | * | 11/2012 | Nakashima | A01K 63/042 261/105 |
| 8,500,104 B2 | * | 8/2013 | Spears | B01F 3/0446 239/9 |
| 8,523,151 B2 | | 9/2013 | Tsuji | |
| 8,906,241 B2 | * | 12/2014 | Kerfoot | B82Y 30/00 210/192 |
| 9,234,407 B2 | | 1/2016 | Meyer | |
| 9,527,046 B1 | | 12/2016 | Roe | |
| 9,586,186 B2 | | 3/2017 | Roe | |
| 2003/0037928 A1 | | 2/2003 | Ramachandran et al. | |
| 2003/0168211 A1 | * | 9/2003 | Arnaud | B01D 21/2433 166/68 |
| 2004/0155371 A1 | * | 8/2004 | Kerfoot | B01F 3/04262 261/122.1 |
| 2005/0194148 A1 | * | 9/2005 | Kerfoot | B09C 1/002 166/369 |
| 2005/0242449 A1 | * | 11/2005 | Kerfoot | B01F 3/04262 261/16 |
| 2007/0051513 A1 | | 3/2007 | Heins | |
| 2007/0108642 A1 | * | 5/2007 | Kerfoot | B01F 3/04262 261/122.1 |
| 2007/0143025 A1 | | 6/2007 | Valdez et al. | |
| 2008/0061006 A1 | * | 3/2008 | Kerfoot | B82Y 30/00 210/760 |
| 2008/0217008 A1 | * | 9/2008 | Langdon | E21B 36/02 166/270 |
| 2008/0236398 A1 | * | 10/2008 | Zhang | B01D 53/62 96/235 |
| 2008/0237141 A1 | | 10/2008 | Kerfoot | |
| 2009/0050549 A1 | * | 2/2009 | Kerfoot | B01F 3/04262 210/139 |
| 2009/0134097 A1 | * | 5/2009 | Kerfoot | B01F 3/04262 210/747.8 |
| 2009/0194280 A1 | * | 8/2009 | Gil | E21B 41/0064 166/267 |
| 2009/0234225 A1 | | 9/2009 | Martin et al. | |
| 2010/0012331 A1 | | 1/2010 | Larter et al. | |
| 2011/0017456 A1 | * | 1/2011 | Koide | B01F 3/0446 166/305.1 |
| 2011/0092726 A1 | * | 4/2011 | Clarke | C12M 21/02 554/175 |
| 2011/0100632 A1 | * | 5/2011 | Dinariev | E21B 43/166 166/305.1 |
| 2011/0127682 A1 | | 6/2011 | Burns et al. | |
| 2012/0228404 A1 | | 9/2012 | Richardson | |
| 2012/0282384 A1 | * | 11/2012 | Tsuji | B01F 3/0446 426/507 |
| 2013/0092626 A1 | | 4/2013 | Zimmerman et al. | |
| 2013/0118977 A1 | | 5/2013 | Eppink et al. | |
| 2013/0199774 A1 | * | 8/2013 | Sultenfuss | E21B 43/164 166/248 |
| 2013/0233782 A1 | | 9/2013 | Eppink et al. | |
| 2013/0341012 A1 | * | 12/2013 | Belani | E21B 43/166 166/250.12 |
| 2014/0000357 A1 | * | 1/2014 | Pissarenko | E21B 47/1015 73/152.41 |
| 2014/0041867 A1 | | 2/2014 | Belgrave | |
| 2014/0048494 A1 | | 2/2014 | Simmons | |
| 2014/0113841 A1 | | 4/2014 | Shirley et al. | |
| 2014/0158631 A1 | | 6/2014 | Govind et al. | |
| 2014/0332212 A1 | * | 11/2014 | Ayers | C09K 8/584 166/279 |
| 2015/0233228 A1 | * | 8/2015 | Roth | E21B 43/128 166/372 |
| 2016/0054729 A1 | | 2/2016 | Payette et al. | |
| 2017/0044425 A1 | * | 2/2017 | Barati Ghahfarokhi | C09K 8/594 |
| 2017/0058186 A1 | * | 3/2017 | Oghena | C09K 8/58 |
| 2017/0216759 A1 | * | 8/2017 | Matteucci | B01D 53/04 |
| 2017/0370200 A1 | * | 12/2017 | Zhang | E21B 43/38 |
| 2018/0073336 A1 | * | 3/2018 | Hardin | E21B 43/166 |

FOREIGN PATENT DOCUMENTS

| | | | |
|---|---|---|---|
| WO | 1992002708 A1 | 2/1992 | |
| WO | WO-2008137189 A2 * | 11/2008 | ........... E21B 43/164 |
| WO | 2014075191 A1 | 5/2014 | |

* cited by examiner 200 nm, more preferably, there are no microbubbles. Nanogas solutions
NANOGAS FLOODING OF SUBTERRANEAN FORMATIONS

CROSS-REFERENCE TO RELATED APPLICATIONS

This disclosure claims the benefit of priority to PCT Appl. No. PCT/US2017/032862, filed 16 May 2017, and U.S. Appl. No. 62/337,431, filed 17 May 2016, the disclosures of which are incorporated herein in their entirety.

FIELD OF THE INVENTION

This disclosure is directed to tools and methods for extracting hydrocarbons from subterranean formations.

BACKGROUND

In the recovery of oil from a subterranean hydrocarbon-bearing formation, it is possible to recover only a portion of the oil in the formation using primary recovery methods that utilize the natural formation pressure to produce the oil. A portion of the oil that cannot be produced from the formation using primary recovery methods may be produced by improved or enhanced oil recovery (EOR) methods. Improved oil recovery methods include waterflooding.

Typically, further oil is produced from the formation after primary recovery by injecting water into the formation to mobilize oil for production from the formation. The injected water may drive a portion of the oil in the formation to a well for production from the formation. Oil not produced from the formation may be trapped within pores in the formation by capillary action of water extending across the pore throats of the pores. As a result, a significant quantity of oil located in the portions of the formation may be left in the formation and not recovered by the waterflood.

Improvements to methods of recovering oil from a hydrocarbon-bearing formation including those having oil trapped by water within pores of the formation are desirable.

SUMMARY

A first embodiment is a process that includes extracting a hydrocarbon from a subterranean formation that has been charged with a nitrogen-nanogas solution.

A second embodiment is a process of oil recovery that includes injecting a nanogas solution into a subterranean formation; admixing the nanogas solution and oil in the subterranean formation; forming a lightened oil that has a reduced viscosity and/or density; carrying the lightened oil to a wellbore; and extracting the lightened oil from the wellbore.

A third embodiment is a downhole nozzle assembly for use in a borehole of a well, that can include a body configured for receipt in the borehole, the body including a proximal end, a terminal end opposite the proximal end, and a longitudinal axis; a conduit extending through the main body along the longitudinal axis, the conduit configured to be attached to a pipe and convey a pressurized fluid stream therethrough; a nozzle in fluid communication with the conduit, the nozzle including a plurality of alternating flow regions configured to produce a nanogas solution from the pressurized fluid stream; and an exit opening in fluid communication with the nozzle, the exit opening configured to permit the nanogas solution to exit the body and enter the bore hole.

A fourth embodiment is nanogas delivery system that includes at least one nozzle assembly that has a body configured for receipt in the borehole, the body including a proximal end, a terminal end opposite the proximal end, and a longitudinal axis; a conduit extending through the main body along the longitudinal axis, the conduit configured to be attached to a pipe and convey a pressurized fluid stream therethrough; a nozzle in fluid communication with the conduit, the nozzle including a plurality of alternating flow regions configured to produce a nanogas solution from the pressurized fluid stream; and an exit opening in fluid communication with the nozzle, the exit opening configured to permit the nanogas solution to exit the body and enter the bore hole.

BRIEF DESCRIPTION OF THE FIGURES

For a more complete understanding of the disclosure, reference should be made to the following detailed description and accompanying drawing figures wherein.

Figure 1:
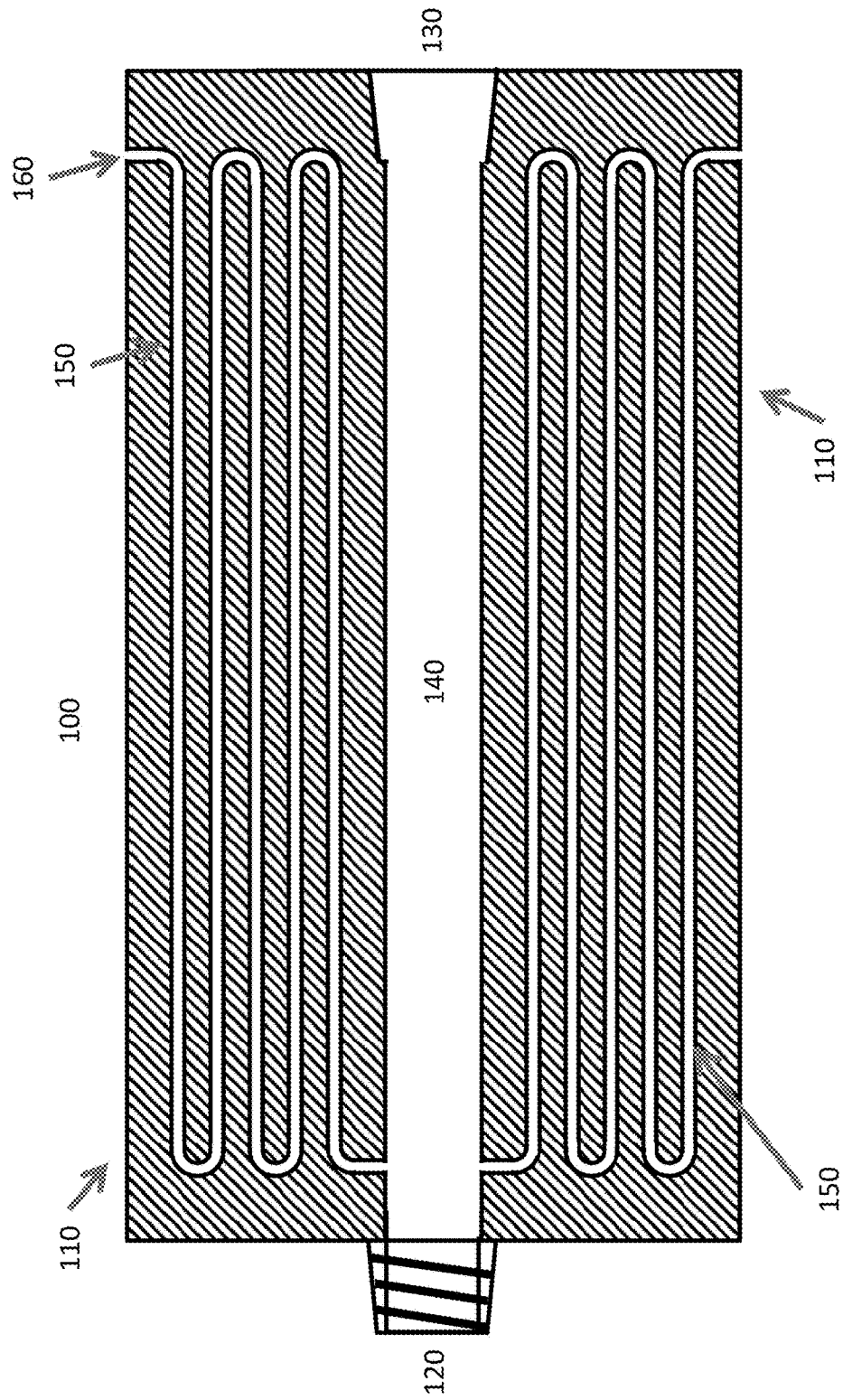
FIG. 1 is a cross-section of a nozzle assembly showing two nozzles connected to a fluidic channel.

While specific embodiments are illustrated in the figures, with the understanding that the disclosure is intended to be illustrative, these embodiments are not intended to limit the invention described and illustrated herein.

DETAILED DESCRIPTION

A first embodiment is a process of extracting a hydrocarbon from a subterranean formation that has been charged with a nanogas solution. Herein, the hydrocarbon extracted from the subterranean formation is typically crude oil. In some instances, the hydrocarbon is a heavy crude oil, where the isolated oil has an API gravity of less than 10°, preferably 8° to 10°. In other instances, the hydrocarbon is a medium and or light crude oil. Preferably, the hydrocarbon is extracted without carrying solids from the subterranean formation. Notably, the subterranean formation can be any oil reserve, for example, mixtures of oil and gas formations, shale formations, and oil sands formations.

The nanogas solution is a homogeneous mixture of nanobubbles and water. As used herein, the term "nanobubbles" means bubbles of a gas within a liquid, wherein the bubbles having an average diameter of about 10 nm to 100 nm; preferably, wherein there are no bubble having a diameter of greater than about 500 nm, about 400 nm, about 300 nm, about 250 nm, or about 200 nm, more preferably, there are no microbubbles. Nanogas solutions have been formed in or by a nanogas solution generator, one example of which is provided in U.S. Pat. No. 9,586,176 which is incorporated herein in its entirety, an additional generator is described in U.S. Pat. No. 8,500,104.

The nanogas solution is preferably homogeneous, that is, the nanobubbles are evenly distributed throughout the solution and appear as a suspended "particulate" in the liquid. Notably, the liquid may further be saturated with or near saturation with the gas that comprises the nanobubbles. A mixture of bubbles and liquid wherein the bubbles coalesce and/or rise to the surface and break is not a homogeneous mixture of nanobubbles and the liquid.

The nanogas solution can include nanobubbles that include, consist essentially of, or consist of oxygen ($O_2$), nitrogen ($N_2$), carbon dioxide ($CO_2$), or a mixture thereof; and can include a liquid that is water, for example, distilled water, di-water, ground water, municipal water, collected water, produced water, or recycled water. As used herein, the terms oxygen and nitrogen refer to the gasses $O_2$ and $N_2$ whether or not the term oxygen gas or nitrogen gas is used.

In one instance, the nanogas solution includes collected water; as used herein collected water means the water that has been used in the oil industry for the hydraulic fracturing of subterranean formations, well stimulation or treatment, specifically water that has been collected from a subterranean use. In another instance the nanogas solution includes produced water; as used herein produced water means the water that has been collected from a subterranean formation (e.g., coming naturally from a formation that contains oil or solids). In yet another instance, the nanogas solution includes recycled water, as used herein recycled water means collected water which has been processed to remove oil and solids.

In yet another instance the nanogas solution includes oxygen, nitrogen, carbon dioxide, or a mixture thereof. In one example, the nanogas solution is a nitrogen-nanogas solution wherein the solution includes, consists essentially of, or consists of nitrogen ($N_2$) and the water. Herein, the term consists essentially of refers to the inclusion of salts, gases, or solutes that may occur in the water (liquid) but have no effect on the performance of the nanogas solution in the herein disclosed processes. Notably, unless rigorously cleaned and degassed, water will always include some concentration of contaminants (solutes and gases). Furthermore, the term consisting essentially of includes the use of recycled water for the formation of the nanogas solution; in this instance, the solution will consist of the gas, water ($H_2O$), and minor concentrations of compounds found in the emulsion from which the recycled water was obtained. Herewith, the nanogas solution preferably consists essentially of the gas and water, wherein the contaminants in the water do not affect the performance of the solution. In another example, the nanogas solution is an oxygen-nanogas solution wherein the solution includes, consists essentially of, or consists of oxygen and water. In still another example, the nanogas solution is a ON-nanogas solution wherein the solution includes, consists essentially of, or consists of oxygen, nitrogen, and water. Herein, an ON-nanogas includes molar ratios of oxygen to nitrogen of 99:1 to 1:99, for example 99:1, 90:1, 80:1, 70:1, 60:1, 50:1, 40:1, 30:1, 20:1, 10:1, 1:1, 1:10, 1:20, 1:30, 1:40, 1:50, 1:60, 1:70, 1:80, 1:90, and 1:99. Preferred molar ratios include about 18:82, 21:79, 28:72, 30:70, 32:68, 35:65, 40:60, 42:58, and 50:50. Other particularly relevant molar ratios can be selected from 50:50; 60:40; 70:30; and 80:20. In yet still another example, the nanogas solution includes carbon dioxide wherein the solution includes, consists essentially of, or consists of carbon dioxide and water, more preferably a mixture of carbon dioxide, nitrogen, and water.

Preferably, the subterranean formation has been charged with a nitrogen-nanogas solution. That is, prior to or concurrent with extraction the subterranean formation was charged with a nitrogen-nanogas solution. In another preferable instance, the subterranean formation had been charged with a carbon dioxide nanogas solution. Even more preferably, the subterranean formation was charged with a nitrogen-nanogas solution and a carbon dioxide nanogas solution prior to extraction of the hydrocarbons.

Herein, the extraction of the hydrocarbon can be during a secondary production phase (secondary recovery); and/or during a tertiary production phase (Enhanced Oil Recovery "EOR"). Notably, during a tertiary production phase, the subterranean formation can be charged with the nanogas solution prior to or concurrent with standard EOR processes.

In another instance, the process includes injecting into the subterranean formation the nitrogen-nanogas solution and can include injecting into the subterranean formation a carbon dioxide nanogas solution. Notably, the nitrogen and the carbon dioxide solutions can be co-injected or separately injected in the subterranean formation. The separate injection can include temporal or location distinctions, that is, the nitrogen and carbon dioxide solutions can be injected at the same time but at different locations and/or one solution can be injected earlier than the other. In one instance, multiple injections of the solutions can incur with alternating solution compositions. In one preferable instance, the nitrogen-nanogas solution is co-injected into the subterranean formation with a carbon dioxide nanogas solution.

Herein, the injection of the nanogas solution into the subterranean formation includes providing a pressurized admixture of the gas and water to an injection nozzle positioned within the subterranean formation. Notably, the nanogas solution utilized herein is manufactured, made, or generated downhole (i.e., within the subterranean formation) and is not produced above ground. Accordingly, in one instance, a pressurized admixture of nitrogen and water is provided to an injection nozzle positioned within the subterranean formation wherein the injection nozzle converts the pressurized admixture into a nanogas solution. In another instance, the pressurized admixture includes carbon dioxide. In yet another instance, the pressurized admixture includes a salt, preferably salt or salts that prevent the dissolution of the formation and/or assist in the disruption of the hydrocarbon from the formation.

In one instance the process can include conveying the pressurized admixture of nitrogen and water through a pipe from an above-ground proximal end of the pipe to a downhole terminal end of the pipe, wherein the terminal end is disposed in the subterranean formation. Then subjecting the pressurized admixture to a plurality of alternating flow regions in a tool in communication with the pipe and disposed at or near the terminal end of the pipe, wherein the flow regions each include a plurality of laminar flow regions and turbulent flow regions configured to produce a nanogas solution from the pressurized admixture. Then, forming a nanogas solution in the tool, and injecting the nanogas solution from the tool into the formation.

In another instance, the process can include collecting a mixture of the hydrocarbon and water from the subterranean formation; and separating the hydrocarbon and the water. The process of separating the hydrocarbon and the water can include providing the mixture to a separation tank (e.g., a float tank) for a density based separation; can include the addition of an additional nanogas solution to facilitate breaking an emulsion in the mixture; and or dewatering the solution through chemical, mechanical, or thermal processes.

Another embodiment is a process of oil recovery that includes injecting a nanogas solution into a subterranean formation; admixing the nanogas solution and oil in the subterranean formation; forming a lightened oil that has a reduced viscosity and/or density; carrying the lightened oil to a wellbore; and extracting the lightened oil from the wellbore. In one instance, the nanogas solution includes a nitrogen-nanogas solution; in another instance, the nanogas solution includes nitrogen and carbon dioxide.

Preferably, the nanogas solution is injected into the subterranean formation by carrying a pressurized admixture of a gas and water to an injection nozzle positioned within the subterranean formation; passing the pressurized admixture through a tube that includes plurality of alternating flow regions within the injection nozzle; and then ejecting the nanogas solution from the injection nozzle. The injection nozzle, preferably, includes a plurality of tubes, each including a plurality of alternating flow regions and the pressurized admixture is, preferably, passed through this plurality of tubes. In one instance, the nanogas solution is injected into the subterranean formation by carrying a pressurized admixture of a gas and water through a pipe from an above-ground proximal end of the pipe to a downhole terminal end of the pipe, wherein the terminal end is disposed in the subterranean formation. The pressurized admixture is then subjected to a plurality of alternating flow regions in a tool in communication with the pipe and disposed at or near the terminal end of the pipe, wherein the alternating flow regions are configured to produce a nanogas solution from the pressurized admixture. The nanogas solution is then formed in the tool and, finally, is injected from the tool into the formation.

In another instance, the oil recovery is an EOR process that includes carbon dioxide flooding of the subterranean formation. In one preferable example, the oil recovery includes both carbon dioxide flooding and injection of the nanogas solution. In another preferable example, the process includes alternating the carbon dioxide flooding and the injection of the nanogas solution, providing a plurality of both.

The process includes lightening the oil in the subterranean formation. Herein, this means, the density and/or viscosity of the oil in the formation is changed to facilitate the movement of the oil in the formation. Preferably, the density and/or the viscosity is/are decreased. Once the oil is lightened, this lightened oil is carried to a wellbore (extraction point) and removed from the subterranean formation. Preferably, the extracted lightened oil includes a lower concentration of solids, asphaltenes, paraffins, resins, and mixtures thereof than oil extracted from the subterranean formation prior to the addition of the nanogas solution. In one example, the concentration of solids, asphaltenes, paraffins, resins, and mixtures thereof is decreased by at least 5%, 10%, 15%, 20%, 25%, 30%, 35%, 40%, 45%, or 50%. In another instance, the extracted lightened oil can have an API above 23°, preferably above 25°, above 27°, or above 30°. That is, the weight of the oil extracted from the subterranean formation, when measured without additional steps following the extraction, has an API, preferably above 23°. Notably, the extracted lightened oil can be further processed to remove additional solids, gases, and water to provide the crude oil. This crude oil can have an API that is less than 22°, that is the crude oil is a heavy oil. In one instance, this heavy oil has an API less than 22°, less than 20°, less than 18°, less than 16°, less than 14°, or less than 12°.

In another instance the lightened oil carried from the wellbore is an admixture of water and oil. The water preferably includes a concentration of nanobubbles (e.g., nitrogen nanobubbles). The oil can include a concentration of carbon dioxide dissolved therein. Preferably the lightened oil includes a concentration of carbon dioxide but is collected from the wellbore with a minimum (less than 50 wt. %, 40 wt. %, 30 wt. %, 20 wt. %, 10 wt. % or 5 wt. %) of water. More preferably, when water is extracted from the wellbore with the lightened oil this mixture does not include an oil-in-water emulsion. That is, the addition of the nitrogen nanogas solution suppresses or prevents the formation of an oil-in-water emulsion in the subterranean formation and decreases or prevents the collection of the oil-in-water emulsion from the wellbore.

Importantly, the machines and processes provided herein provide nanogas solutions without macrobubbles and/or without the formation of macrobubbles. Preferably, none of the nanogas solutions utilized herein form or include macrobubble (i.e., any bubble larger than a nanobubble).

In another instance, the tool described herein can be utilized for addition of a nanogas solution to oil sands tailings held in a tailings pond. That is, the tool can be utilized for the subsurface injection of the nanogas solution into the tailings below the surface of the tailings pond. In a preferable example, the addition of the nanogas solution (e.g., a nitrogen-nanogas solution) to the tailings pond increases the rate of separation of the oils, water, and solids contained in the tailings. In another preferable example, the addition of a nanogas solution that includes oxygen (e.g., an oxygen-nanogas solution or an ON-nanogas solution) and oxidizes hydrogen sulfide and/or other oxidizable components of the tailings solution. In one example, the addition of an oxygen including nanogas solution additionally causes hydrocarbon materials to agglomerate and increase separation; in another example, the addition of a nitrogen nanogas solution separates and lightens the oil(s) and allows for more facile removal of the hydrocarbons from the surface of the tailings pond. Preferably, the addition of the nanogas solution increases the settling rate by a factor of 1.1, 1.2, 1.3, 1.4, 1.5, 1.6, 1.7, 1.8, 1.9, or 2.0. More preferably, the addition of the nanogas solution increases the settling rate by at least 2 times.

In a particular instance, the method can include admixing a nanogas solution with oil sands tailings and then separating materials including silts, residual bitumen, and organic compounds from water in the oil sands tailings. In this instance, the nanogas solution includes nitrogen nanobubbles, oxygen nanobubbles, carbon dioxide nanobubbles or a mixture thereof. In one case, the nanogas solution is a nitrogen-nanogas solution. In another case, the viscosity of oil in the tailings is reduced as an effect of the addition of the nanogas solution. In yet another case the process includes further admixing an oxygen-nanogas solution with the oil sands tailings; and oxidizing a sulfide. The process can includes admixing the nanogas solution with the tailings and then adding the admixture to a tailings pond; can include subservice injection and admixing of the nanogas solution and the tailings, for example the subsurface injection of the nanogas solution into tailings held in a tailings pond.

That is, the tool can be utilized for the subsurface injection of the nanogas solution into the tailings below the surface of the tailings pond. In a preferable example, the addition of the nanogas solution (e.g., a nitrogen-nanogas solution) to the tailings pond increases the rate of separation of the oils, water, and solids contained in the tailings. In another preferable example, the addition of a nanogas solution that includes oxygen (e.g., an oxygen-nanogas solution or an ON-nanogas solution) and oxidizes hydrogen sulfide and/or other oxidizable components of the tailings solution. In one example, the addition of an oxygen including nanogas solution additionally causes hydrocarbon materials to agglomerate and increase separation; in another example, the addition of a nitrogen nanogas solution separates and lightens the oil(s) and allows for more facile removal of the hydrocarbons from the surface of the tailings pond.

In still another embodiment, the tool described herein can be utilized for addition of a nanogas solution to landfills. The addition of the nanogas solution can be to a bioreactor landfill, an aerobic landfill, an anaerobic landfill, or a hybrid landfill. Notably, the addition of an oxygen containing nanogas solution to a hybrid or anaerobic landfill can convert the landfill to a bioreactor or aerobic landfill. Preferably, the nanogas solution includes a percentage of oxygen (is an oxygen-nanogas solution or an ON-nanogas solution) that promotes aerobic digestion in the landfill, decreases the methanogenesis in the waste, and decreases methane emissions from the landfill.

An ON-nanogas solution is a solution that includes, consists essentially of, or consists of oxygen ($O_2$), nitrogen ($N_2$), and water. Herein, an ON-nanogas includes molar ratios of oxygen to nitrogen in the range of 99:1 to 1:99; examples include 99:1, 90:1, 80:1, 70:1, 60:1, 50:1, 40:1, 30:1, 20:1, 10:1, 1:1, 1:10, 1:20, 1:30, 1:40, 1:50, 1:60, 1:70, 1:80, 1:90, and 1:99. Preferred molar ratios include about 18:82, 21:79, 28:72, 30:70, 32:68, 35:65, 40:60, 42:58, and 50:50. One particularly relevant molar ratio is 21:79 (air). Other particularly relevant molar ratios can be selected from 50:50; 60:40; 70:30; and 80:20. In particular, the amount of oxygen (relative to the amount of nitrogen) can be varied to achieve different results, and the higher the concentration of the composition that is desired to be oxidized the higher the oxygen concentration can be. In one instance, the addition of the oxygen nanogas solution to the landfill promotes the oxygenation of sulfides in the landfill and the reduction of noxious gases from the waste mass.

Another embodiment, useful in the processes described herein, is a downhole nozzle assembly 100 for use in a borehole of a well (FIG. 1). The nozzle assembly 100 preferably includes a body 110 configured for receipt in the borehole, the body including a proximal end 120, a terminal end 130 opposite the proximal end 120, and a longitudinal axis. The assembly further includes a conduit 140 extending through the main body along the longitudinal axis, the conduit configured to be attached to a pipe and convey a pressurized fluid stream therethrough. In one instance, the nozzle assembly includes a nozzle 150 in fluid communication with the conduit, the nozzle 150 including a plurality of alternating flow regions configured to produce a nanogas solution from the pressurized fluid stream. In another instance, the nozzle assembly includes a plurality of capillary tubes in fluid communication with the conduit and configured to produce a nanogas solution from the pressurized fluid stream. The nozzle assembly further includes an exit opening 160 in fluid communication with the nozzle or capillary tubes, the exit opening configured to permit the nanogas solution to exit the body and enter the bore hole.

In one instance, the alternating flow regions of the nozzle assembly are laminar flow regions and turbulent flow regions. In another instance, the alternating flow regions of the nozzle assembly are substantially linear and radially bent flow regions. Herein, the substantially linear flow regions, preferably, provide laminar flow and the radially bent flow regions, preferably, provide turbulent flow. The substantially linear regions or the laminar flow regions can be oriented along the longitudinal axis or these regions can be oriented at an angle relative to the longitudinal axis (e.g., at an angle of about 0° to about 45° relative to the longitudinal axis). Preferably, these regions are substantially parallel in the nozzle assembly. In another instance, the alternating flow regions are distinguished by their respective calculated Reynolds numbers which differ by at least 500, 1000, 1500, or 2000. In still another instance, the alternating flow regions are a first radially bent flow region and a second radially bent flow region; where these two radially bent flow regions can have an arc angle that is substantially similar (e.g., about 180°) but have significantly (e.g., factor of at least 2, 3, 4, 5, 6, 7, 8, 9, or 10) larger arc length and arc radius; preferably the arc radii differ by at least a factor of 5, more preferably a factor of 10.

Figure 3:
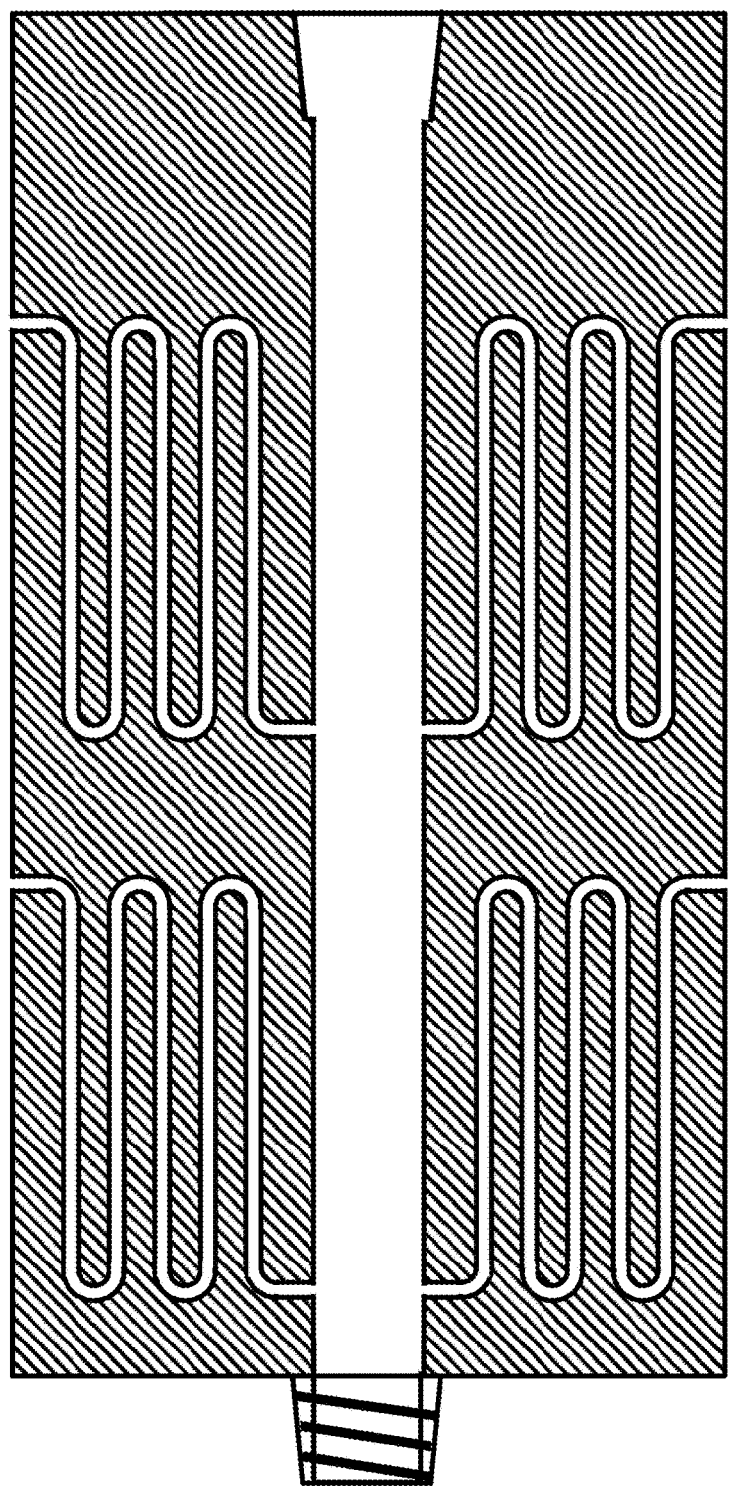
FIG. 3 is a cross-section of a nozzle assembly having multiple sets of radially positioned nozzles.

The nozzle assembly 100, preferably, includes a plurality of nozzles 150, each in fluid communication with one of a plurality of exit openings 160. That is, the nozzle assembly includes a plurality of substantially identical nozzles extending from the conduit to the exit openings and configured to produce a plurality of nanogas solution streams. In one instance, the nozzle assembly can include four nozzles arranged in a spaced apart configuration, wherein each of the plurality of nozzles extends from the conduit to an outer wall of the body. When there are four nozzles, the nozzles, preferably, extend radially at about 90 degree increments from the conduit. In other instances, the plurality of nozzles can include 2, 3, 4, 5, 6, 7, 8, 9, or 10 nozzles—the limitation being the radially available space. In yet another instance shown in FIG. 3, the nozzle assembly can have multiple sets of pluralities of radially spaced nozzles, where each set is spaced along the longitudinal axis of the nozzle assembly. In one example, the nozzle assembly can have two sets of four nozzles (eight total), where the two sets are spaced along the longitudinal axis, and the four nozzles in each set are radially spaced. The two sets can include nozzles having radially similar locations, or the nozzles in one set can be offset relative to another set. Preferably and for simplicity in manufacture, the sets are stacked, or positioned longitudinally without any radial distinction.

Due to the nature of the borehole, the body of the nozzle assembly is, preferably, cylindrical. While other shapes are imagined, including square (with four radially spaced nozzles), hexagonal (with six radially spaced nozzles), and octagonal (with eight radially spaced nozzles), the cylindrical nature of the borehole (and coiled tubing which can carry the nozzle assembly downhole) provides a preference for the cylindrical shape.

The nozzle assembly, in particular the body, is preferably formed of stainless steel; notably the body and parts utilized herein are preferably made of stainless steel but can be optionally made of or include other metals or ceramics that are compatible with the process of forming the nanogas solution and the subterranean environment. In one instance, the nozzle assembly includes or consists of a plurality of stainless steel pieces assembled and welded or brazed. In another instance, the nozzle assembly includes a plurality of stainless steel support pieces in intimate contact with a stainless steel tube arranged (e.g., bent or shaped) to be a nozzle. For example, the nozzle assembly can include at least two stainless steel body pieces that have matching half-cylindrical contours cut into the opposing surfaces. When assembled (matched) these two half-cylindrical contours can form a flow path from the conduit to the exit opening. To minimize fluidic disturbances in the assembled piece a stainless steel tube can be positioned within volume created by the two half-cylindrical contours. In another instance, the body can include an outer tube carrying the exit openings and the conduit extending through the outer tube along a longitudinal axis (a pipe within a pipe). In this instance, a plurality of tubes (preferably, stainless steel tubes) connect the conduit to the exit openings. Notably, this instance can include an internal volume between the outer tube and the conduit wherein the plurality of tubes traverse. Preferably, this internal volume is filled to support the nozzle assembly at the pressures encountered within a subterranean formation. In one instance, the internal volume is filled with stainless steel. In another instance, the internal volume is filled with a ceramic, for example a concrete, a clay ceramic, an inorganic metal oxide, or a plastic ceramic. Notably, the nozzle assembly can be formed from the outer tube, conduit, and plurality of tuber (nozzles), and then the ceramic poured into the internal volume, cured and/or set according to the procedures needed to harden and form the ceramic. The stainless steel tube can have an inside diameter in the range of about 0.5 mm to about 100 mm, about 1 mm to about 50 mm, about 2 mm to about 25 mm, or about 5 mm to about 20 mm. When supported (preferably in intimate contact throughout its length) the stainless steel tube have a narrow wall thickness, for example the wall thickness can be about 0.1 mm to about 7 mm, preferably about 0.2 mm to about 4.5 mm. Notably, when the ID is less than about 10 mm, the wall thickness is about 0.1 mm to about 1 mm, preferably about 0.1 mm to about 0.5 mm. When the ID is greater than about 10 mm, the wall thickness can be greater than about 0.5 mm but is preferably about 0.2 mm, 0.3 mm, 0.4 mm, 0.5 mm, 0.6 mm, 0.7 mm, 0.8 mm, 0.9 mm, 1 mm, 1.2 mm, 1.5 mm, 1.75 mm, 2 mm, 2.5 mm, 3 mm, or within any range thereof.

Figure 2:
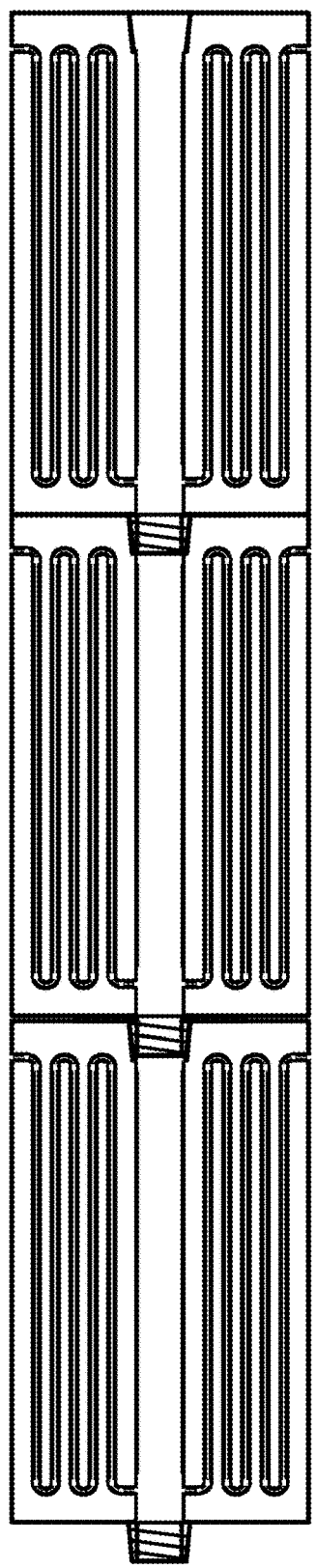
FIG. 2 is a depiction of a plurality of nozzle assemblies connected in-line.

Preferably, each nozzle assembly is configured to be modular and assembled in series with other nozzle assemblies (see FIG. 2). That is, the body of a first nozzle assembly is configured to affix to the body of a second nozzle assembly. While the nozzles assemblies are envisioned as identical units, each nozzle assembly in a series can be the same or different. To facilitate the connection between adjoining nozzles assemblies, the conduit can include an extending portion that extends from, for example, the proximal end and can include interior threads formed at or near the terminal end of the body, the interior threads sized and shaped to threadably connect to the exterior threads of the extending portion. Notably, the position of the extending portion and the interior threads can be reversed and the extending portion can be proximal to the terminal end and the interior threads proximal to the proximal end. In other embodiments, some nozzle assemblies can include interior threads at both the terminal and proximal ends and/or some nozzle assemblies can include extending portions at both the terminal and proximal ends. Preferably, the nozzle assembly includes threads (exterior and interior) shaped to threadably connect to a pipe (e.g., a pipe configured to provide a pressurized admixture to the nozzle assembly).

Figure 4:
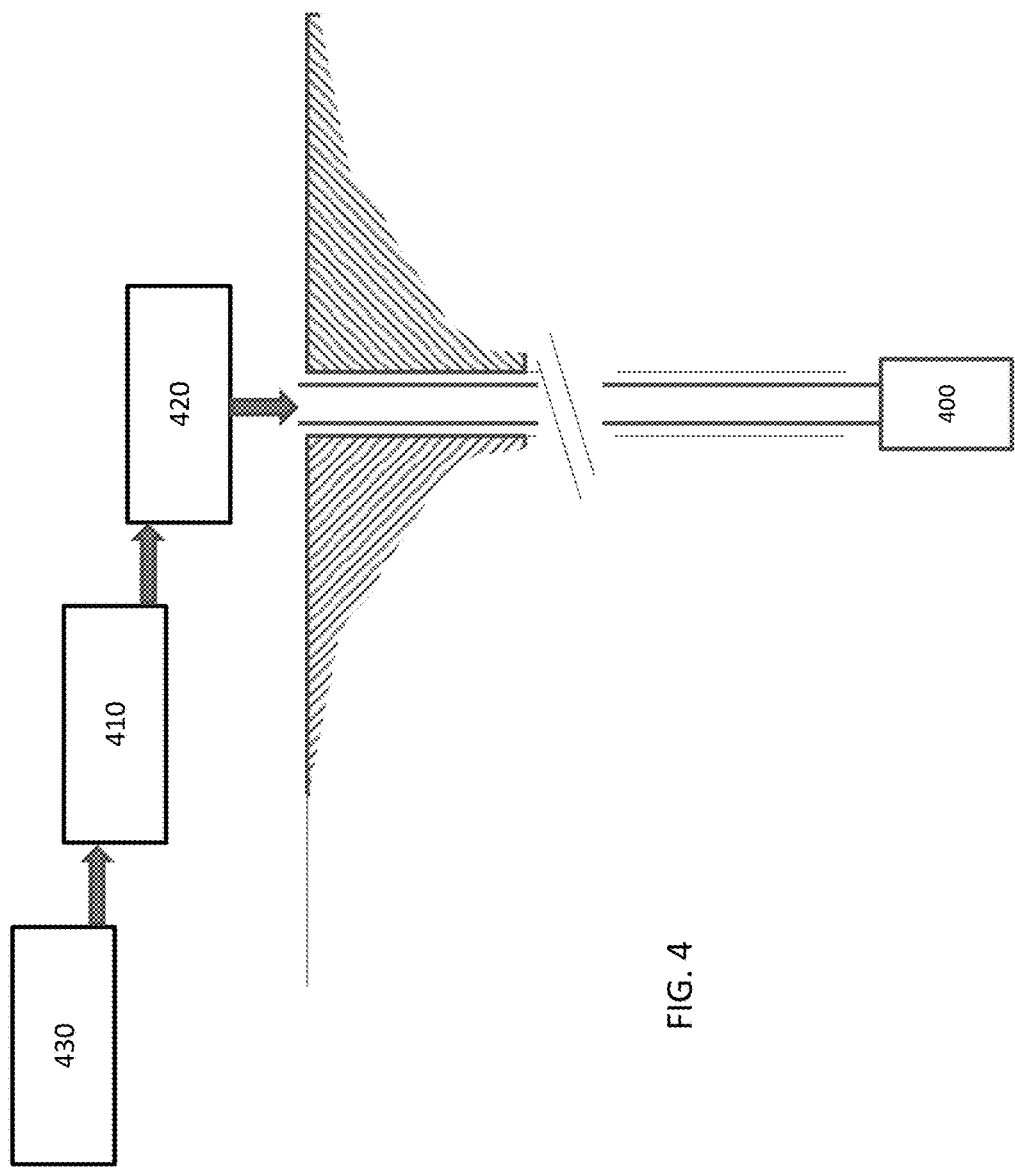
FIG. 4 is a depiction of the nozzle assembly in use in a nanogas delivery system.
Figure 5:
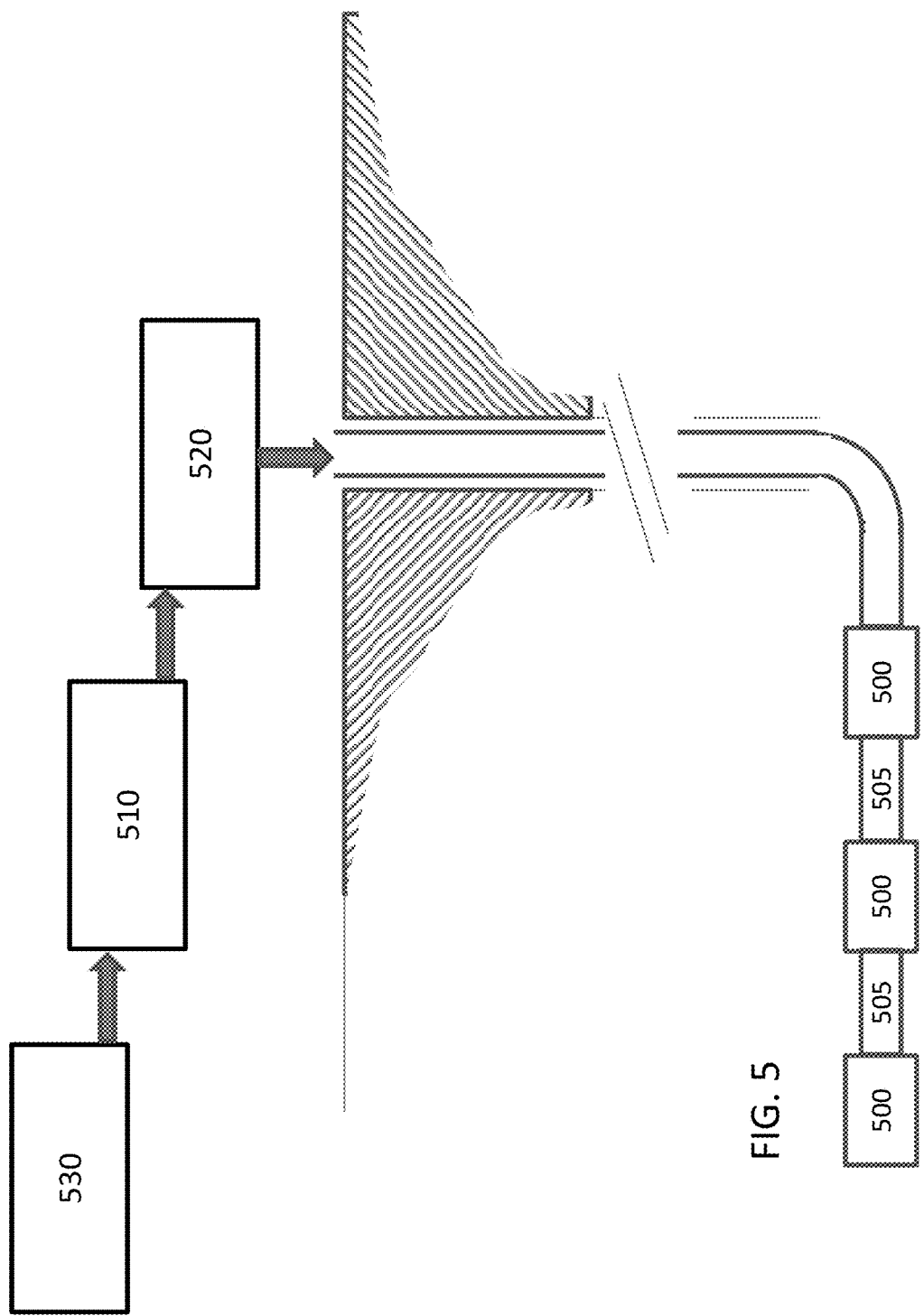
FIG. 5 is a depiction of a plurality of nozzle assemblies in use in a nanogas delivery system.

Yet another embodiment is a nanogas delivery system (FIG. 4) that includes at least one of the above described nozzle assemblies 400. The nanogas delivery system preferably includes at least two fluid pumps in series 410, 420. These pumps configured to supply a pressurized fluid stream (the pressurized admixture) to the nozzle assembly which is configured to convert the pressurized admixture to a nanogas solution. The pumps, preferably, in fluid communication with a pressurized vessel 430 that is configured to supply, at least, the fluid for the pressurized fluid stream (pressurized admixture), and preferably, configured to provide the pressurized admixture of a gas and the fluid. The nanogas delivery system can include a plurality of nozzle assemblies 400 connected in series as shown in FIG. 2 or separated by exterior conduit(s) (as shown in FIG. 5). In one example, the nanogas delivery system can be applied to a vertical borehole (e.g., FIG. 4); in another example, the nanogas delivery system can be applied in a horizontal borehole (e.g., FIG. 5). Preferably, the vertical and horizontal boreholes include a plurality of nozzle assemblies connected in series or separated by exterior conduits. In reference to FIG. 5, a nanogas delivery system can include a plurality of nozzle assemblies 500 spaced through the subterranean formation by a series of fluidly connected exterior conduits 505. The exterior conduits 505 configured to convey the pressurized fluid stream therethrough. The exterior conduits 505 are afixed to the nozzle assemblies 500, for example the exterior conduits 505 can be threadably connected to the interior and/or exterior threads on the nozzle assemblies 500. Other connections are envisioned, including flang connections, camlock couplings, welds, and brazings. This example includes the nozzle assemblies 500 in fluid connection with at least two fluid pumps in series 510, 520 which are in fluid communication with a pressurized vessel 530 configured to supply, at least, the fluid for the pressurized fluid stream (pressurized admixture), and preferably, configured to provide the pressurized admixture of a gas and the fluid. The exterior conduits 505 can be of equal length (or absent) thereby configuring the nanogas delivery system to provide a regularly spaced nanogas solution to the subterranean formation or the exterior conduits 505 can include a plurality of lengths thereby spacing the nozzle assemblies in different subterranean formation or in different sections of one subterranean formation (for example to provide differential pressure within a formation).

What is claimed:

1. A process comprising:
    conveying a pressurized admixture of a gas and water through a pipe from an above-ground proximal end of the pipe to an injection nozzle positioned within a subterranean formation;
    converting the pressurized admixture to a nanogas solution via the injection nozzle;
    injecting the nanogas solution from the injection nozzle into the subterranean formation; and then
    extracting a hydrocarbon from the subterranean formation that was charged with the nanogas solution.

2. The process of claim 1, wherein the gas is carbon dioxide, and the nanogas solution is a carbon dioxide-nanogas solution.

3. The process of claim 1, wherein the nanogas solution consists essentially of the gas and water.

4. The process of claim 1, wherein the gas is nitrogen, and the nanogas solution is a nitrogen-nanogas solution.

5. The process of claim 4 further comprising injecting into the subterranean formation a carbon dioxide-nanogas solution.

6. The process of claim 5, wherein the nitrogen-nanogas solution is co-injected into the subterranean formation with the carbon dioxide-nanogas solution.

7. The process of claim 1 further comprising
    subjecting the pressurized admixture to a plurality of alternating flow regions in the injection nozzle which is in communication with the pipe and disposed at or near the terminal end of the pipe, wherein the injection nozzle is configured to produce the nanogas solution from the pressurized admixture.

8. The process of claim 1, wherein the pressurized admixture includes a salt.

9. The process of claim 1 further comprising collecting a mixture of the hydrocarbon and water from the subterranean formation; and separating the hydrocarbon and the water.

10. A process of oil recovery comprising:
conveying a pressurized admixture of a gas and water through a pipe from an above-ground proximal end of the pipe to an injection nozzle positioned within a subterranean formation;
converting the pressurized admixture to a nanogas solution via the injection nozzle;
injecting the nanogas solution into the subterranean formation;
admixing the nanogas solution and oil in the subterranean formation;
forming a lightened oil that has a reduced viscosity and/or reduced density;
carrying the lightened oil to a wellbore; and
extracting the lightened oil from the wellbore.

11. The process of claim 10, wherein the nanogas solution includes a nitrogen-nanogas solution.

12. The process of claim 10, wherein the nanogas solution consists essentially of the gas and water.

13. The process of claim 10, wherein the gas includes nitrogen and carbon dioxide.

14. The process of claim 10, wherein the nanogas solution is injected into the subterranean formation by
subjecting the pressurized admixture to a plurality of alternating flow regions in the injection nozzle which is in communication with the pipe and disposed at or near the terminal end of the pipe, wherein the alternating flow regions are configured to produce a nanogas solution from the pressurized admixture.

15. The process of claim 14, wherein the injection nozzle includes a plurality of tubes, each including a plurality of alternating flow regions; and wherein the pressurized admixture is passed through the plurality of tubes.

16. The process of claim 10 further comprising carbon dioxide flooding of the subterranean formation.

17. The process of claim 16 further comprising alternating a plurality of carbon dioxide flooding and nanogas solution injection.

18. The process of claim 10, wherein the extracted lightened oil includes a lower concentration of solids, asphaltenes, paraffins, resins, and/or mixtures thereof than oil extracted from the subterranean formation prior to the addition of the nanogas solution.

19. The process of claim 10, wherein the extracted lightened oil has an API above 23°.

20. The process of claim 19 further comprising separating water from the lightened oil thereby providing a heavy oil; wherein the heavy oil has an API less than 22°.

* * * * *